(12) United States Patent
Kennedy et al.

(10) Patent No.: US 11,969,612 B2
(45) Date of Patent: Apr. 30, 2024

(54) SAFETY EQUIPMENT

(71) Applicant: SKANSKA UK PLC, Hertfordshire (GB)

(72) Inventors: Richard Kennedy, Hertfordshire (GB); Alex Hoyos, Hertfordshire (GB)

(73) Assignee: SKANSKA UK PLC, Rickmansworth (GB)

( * ) Notice: Subject to any disclaimer, the term of this patent is extended or adjusted under 35 U.S.C. 154(b) by 0 days.

(21) Appl. No.: 16/417,067

(22) Filed: May 20, 2019

(65) Prior Publication Data
US 2019/0269949 A1 Sep. 5, 2019

Related U.S. Application Data

(63) Continuation of application No. 14/439,611, filed as application No. PCT/GB2013/000462 on Oct. 30, 2013, now abandoned.

(30) Foreign Application Priority Data

Nov. 1, 2012 (GB) ...................................... 1219688

(51) Int. Cl.
A62B 35/00 (2006.01)
F16B 45/02 (2006.01)

(52) U.S. Cl.
CPC ........ *A62B 35/0075* (2013.01); *F16B 45/023* (2021.05); *F16B 45/028* (2021.05)

(58) Field of Classification Search
CPC ............ A62B 35/0075; A62B 35/0025; A62B 35/0068; A62B 35/0087; F16B 45/02; F16B 45/00; G01B 7/16
See application file for complete search history.

(56) References Cited

U.S. PATENT DOCUMENTS

| | | | | |
|---|---|---|---|---|
| 2,647,293 A * | 8/1953 | Wintercorn | ........ | A62B 35/0018 182/4 |
| 4,423,796 A * | 1/1984 | Sulowski | .................. | E06C 7/18 182/8 |
| 6,330,931 B1 * | 12/2001 | Baillargeon | ....... | A62B 35/0068 182/2.1 |
| 7,106,205 B2 * | 9/2006 | Graef | ................. | A62B 35/0012 340/687 |
| 8,325,053 B2 * | 12/2012 | Flynt | .................. | A62B 35/0025 182/4 |

(Continued)

FOREIGN PATENT DOCUMENTS

EP 2314354 A2 4/2011
FR 2755236 A1 4/1998
(Continued)

OTHER PUBLICATIONS

International Search Report dated Jul. 3, 2014, for International Patent Application No. PCT/GB2013/000462.

*Primary Examiner* — Colleen M Chavchavadze
(74) *Attorney, Agent, or Firm* — KARCESKI IP LAW, PLLC

(57) ABSTRACT

A safety system includes (a) a rope or lanyard; (b) a safety hook attached to the rope or lanyard; (c) a load detection sensor retrofit to the hook without altering the structural integrity of the hook; and (d) a transmitter arranged to convey a load status signal.

9 Claims, 6 Drawing Sheets

(56) References Cited

U.S. PATENT DOCUMENTS

| | | | | |
|---|---|---|---|---|
| 8,387,218 | B2* | 3/2013 | Strasser | F16B 45/021 24/600.1 |
| 8,675,823 | B2* | 3/2014 | Hooten | A62B 35/04 379/37 |
| 8,902,074 | B2* | 12/2014 | Landry | A62B 35/0018 280/808 |
| 9,153,115 | B1* | 10/2015 | Ulner | G08B 25/016 |
| 9,174,072 | B2* | 11/2015 | Strasser | E04G 21/3295 |
| 9,245,434 | B2* | 1/2016 | Baillargeon | G08B 25/08 |
| 9,392,826 | B2 | 7/2016 | Beckett | |
| 10,092,784 | B2* | 10/2018 | Dehondt | A62B 35/0037 |
| 10,138,102 | B2* | 11/2018 | Baillargeon | B66F 17/006 |
| 11,029,224 | B2* | 6/2021 | Carnicke | G01L 1/2281 |
| 11,285,346 | B2* | 3/2022 | Palet | F16M 11/2021 |
| 2008/0210178 | A1* | 9/2008 | Frach | F22B 37/56 122/1 R |
| 2009/0145239 | A1* | 6/2009 | Girshovich | G01B 7/16 73/779 |
| 2011/0090079 | A1* | 4/2011 | Morino | A62B 35/0075 340/532 |
| 2012/0217091 | A1 | 8/2012 | Baillargeon et al. | |
| 2015/0231423 | A1* | 8/2015 | Perner | A62B 35/0075 24/505 |
| 2015/0265860 | A1* | 9/2015 | Kennedy | F16B 45/02 182/3 |

FOREIGN PATENT DOCUMENTS

| | | | |
|---|---|---|---|
| GB | 2486012 A | | 6/2012 |
| JP | 2019005425 A | * | 1/2019 |
| JP | 2021168983 A | * | 10/2021 |

* cited by examiner

SAFETY EQUIPMENT

CROSS-REFERENCE TO RELATED APPLICATIONS

This is a continuation of U.S. patent application Ser. No. 14/439,611, filed on Apr. 29, 2015, which is a National Stage Entry into the United States Patent and Trademark Office from International PCT Patent Application No. PCT/GB2013/000462, having an international filing date of Oct. 30, 2013, and which claims priority to United Kingdom Patent Application No. GB 1219688.7, filed Nov. 1, 2012, the entire contents of all of which are incorporated herein by reference.

FIELD OF THE INVENTION

The present invention relates to retrofitable safety equipment for use with safety systems. In particular, but not exclusively, the present invention relates to safety equipment for use with construction safety systems.

DESCRIPTION OF RELATED ART

According to the UK's Health and Safety Executive (HSE) construction falls from height are the biggest cause of fatal injury in the nation's workplaces; further, they represent roughly 50% of work-related deaths in the construction sector. In addition, over 4,000 major injuries, such as broken bones or fractured skulls, are reported to HSE each year by the construction industry and around 50% of these serious injuries relate are caused by falls from height. Although safety equipment such as safety belts, hooks and security lines have been in use in the industry for years, in practice, a high proportion of workers carry out their work while the safety equipment is disconnected. Both HSE and employers in the industry have taken steps to improve observance of safety regulations and to prevent deaths and injuries from falls; for example HSE has implemented heavy fines which are levied on contractors if personnel are found to be using safety equipment incorrectly on a site. However, on large building projects it is very difficult to monitor workers continuously to ensure that they always adhere to safety rules and practice.

However, the construction industry continues to cause more deaths than any other industrial sector. Consequently, safety systems which allow usage of safety equipment to be monitored have been proposed. For example, EP2314354 describes a safety system and a safety belt comprising a connecting member, a rope, an attaching portion, a hook, and a load detection portion arranged to detect whether or not a load is applied to the connecting member and to generate a load detection signal which is sent to a control device including a receiver unit arranged to receive the load detection signal and a notification unit arranged to provide a warning or alarm. In this system, the control unit determines the status of a user or the status of the safety belt based on the load detection signal and the notification unit provides a visible or audible alarm if a load is detected or if the safety belt is disconnected.

The disadvantage of the system proposed by EP2314354 and other known systems is that the components described therein are not standard and are therefore every expensive to manufacture. Moreover, the components have not been subject to the rigorous functional and structural testing necessary for approval in jurisdictions such as the European Union and the US; as a result, it is unknown whether the hooks and lines described in EP2314354 are able to withstand the stresses borne by standard hooks or karabiners and standard lines. Further, safety equipment for use in the European construction industry must comply with IP65, that is, equipment must be totally protected against dust ingress and must also be protected against high pressure water jets from any direction.

SUMMARY OF THE INVENTION

The present invention therefore aims to provide a safety system which complies with security and ingress protection standards, composition and structural standards and which is cheaper to manufacture than prior art systems.

According to the present invention there is provided a safety system comprising: a load detection sensor retrofitable on a safety hook; a transmitter arranged to convey a load status signal; processing means for analysing the load status signal; a receiver for receiving the load status signal and being operably connected to the processing means; warning means arranged to generate notifications; and a power source for providing energy to the transmitter, the receiver, and the processing means; wherein the load detection sensor is arranged to generate a load status signal which is sent by the transmitter to the receiver and then analysed by the processing means so that when the load status signal indicates that a load is undetected or that the safety hook is connected, the warning means are either inactive or generate a first notification but when the pressure status signal indicates that a load is detected or that the safety hook is disconnected, the warning means generate a second notification.

Advantageously, the load detection sensor is a pressure sensor. Preferably, the pressure sensor is a piezoelectric sensor or comprises quantum tunneling composites or comprises a cable operably connected to a first self-energising switch arranged to be activated when the cable is in a pulled condition and second self-energising switch arranged to be activated when the cable is in a relaxed condition.

In a preferred embodiment, a second load detection sensor is retrofitable on a second safety hook. In another preferred embodiment, the warning means are adapted to generate a visual notification, an audible notification or a visual and an audible notification. Preferably, the warning means is at least one LED light.

Advantageously, the safety system comprises a timer arranged to generate an alarm after a predetermined time threshold has been exceeded or a counter arranged to generate an alarm after a predetermined time threshold has been exceeded.

In a preferred embodiment, the transmitter includes at least one self energising switch.

Preferably, the processing means, the receiver and the warning means are included in a beacon. More preferably, the safety system further comprises activation means.

According to a second aspect of the present invention there is provided, a safety hook comprising a load detection sensor and a plastics layer wherein the load detection sensor is retrofitted on the safety hook by shrink-wrapping the plastics layer with heat.

Still further, the present invention provides a safety system that includes (a) a rope or lanyard; (b) a safety hook attached to the rope or lanyard; (c) a load detection sensor retrofit to the hook without altering the structural integrity of the hook; and (d) a transmitter arranged to convey a load status signal.

In one contemplated embodiment of the safety system the load status signal may be sent by the transmitter and used to generate notifications.

In yet another contemplated embodiment, the notification may be indicative that a load is undetected or a safety hook is connected to a safety line.

Still further, the safety system may be constructed where the notification is indicative that a load greater than a predetermined threshold is detected or the safety hook is disconnected.

In addition, it is contemplated that the safety system may include two lanyards and two safety hooks, each of which is attached to one lanyard; and a load detection sensor retrofit to each hook without altering the structural integrity of the respective hook.

In one embodiment, the load detection sensor may be a pressure sensor.

The safety system also may include warning means adapted to generate a visual notification, an audible notification, or a visual and an audible notification.

The warning means may be an LED light.

In another contemplated embodiment, the safety system may have a beacon that includes processing means, a receiver and warning means.

The present invention also provides a method of providing a safety system. The method includes: (a) providing a rope or lanyard that has an attached safety hook; and (b) retrofitting a load detection sensor to the hook without altering the structural integrity of the hook.

Still other aspects of the present invention will be made apparent from the discussion that follows and from the drawings appended hereto.

BRIEF DESCRIPTION OF THE DRAWINGS

Preferred embodiments of the present invention will be described, by way of example only, with reference to the accompanying drawings in which.

DETAILED DESCRIPTION OF EMBODIMENT(S) OF THE INVENTION

Figure 1:
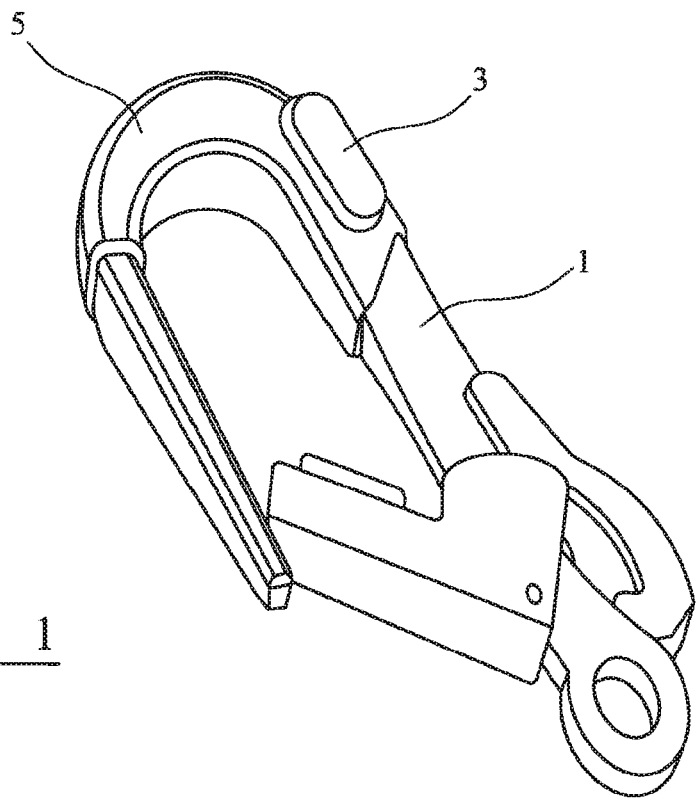
FIG. 1 shows a safety hook having a load detection sensor in accordance with a first embodiment of the present invention.

Referring now to FIG. 1 there is shown a safety hook 1 according to a first embodiment of the present invention.

The safety hook 1 has an upper section which has been retrofitted with a load detection sensor 5 formed by a layer of shrinkable polymer plastics material (such as polyolefin) incorporating, coated or impregnated with quantum tunnelling composite materials, such as QTC (RTM). This type of composite material is a mixture of conductive filler particles (such as highly-conductive metals) and elastomeric binders (for example silicone rubber) which use quantum tunnelling for pressure switching and sensing. Quantum tunnelling composite materials have the ability to change from an electrical insulator to a conductor when placed under pressure so that when pressure is absent the atoms of the conductive metals are too distant to conduct electricity but when pressure is applied, the conductive atoms congregate and electrons conduct electricity through the composite. Accordingly, these materials can be used to detect even very small changes due to compression, tension or other stresses. In the present invention, the load detection sensor 5 is able to detect a pressure change caused by a load being applied on the hook.

The load detection sensor 5 described above can be shrunk onto a standard hook 1 such as a karabiner, ascender, descender, fall arrester, crane hook and scaffold hook by simply applying heat with a heat gun, or any method suitable to shrink-wrap the upper section of the hook. A transmitter 3 is connected to or included in the load detection sensor. In use, the load detection sensor 5 perceives the pressure change generated by attaching the hook 1 to a rope or a lanyard and generates a first load status signal which is sent by the transmitter 3 to a receiver operably connected to processing means. The processing means analyses the load status signal and allows warning means to generate a notification or signal, for example a visible green light, to indicate that the hook is fastened. In the event the pressure changes again because a heavier load, such as one produced by a fall from a scaffold, is applied, the load detection sensor 5 generates a second load status signal. When the second load status signal is analysed by the processing means, a second notification, for example an audible alarm is generated by the warning means to enable the user and those around him to identify that a heavy load is being applied on the hook.

Figure 2:
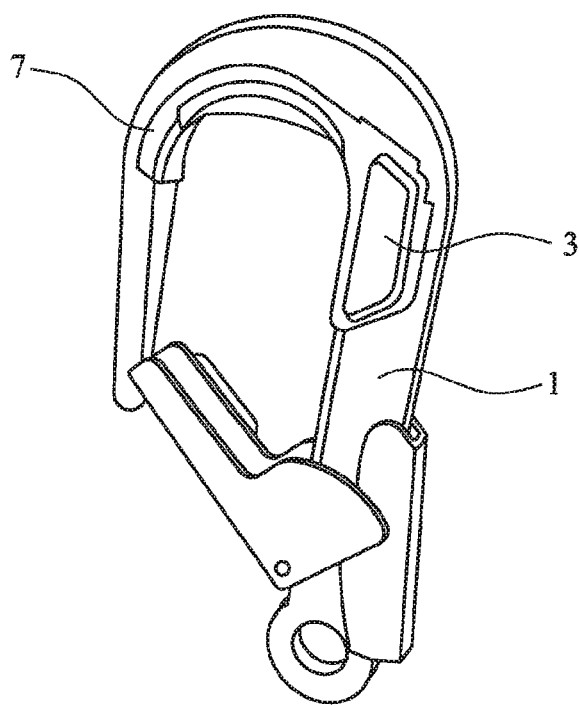
FIG. 2 shows a safety hook having a load detection sensor in accordance with a second embodiment of the present invention.

Referring now to FIG. 2 there is shown a safety hook 1 comprising a load detection sensor 7 according to a second embodiment of the present invention. In this embodiment, the load detection sensor is a piezoelectric sensor arranged to generate an electrical signal or electrical charge in response to pressure change. The load detection sensor 7 is mounted on a rigid plate which has been adhered to a standard safety hook 1. A transmitter 3 is also mounted on the plate. In use, the safety system of this embodiment works in the same way as that described in relation to the safety system of the first embodiment.

Figure 3A:
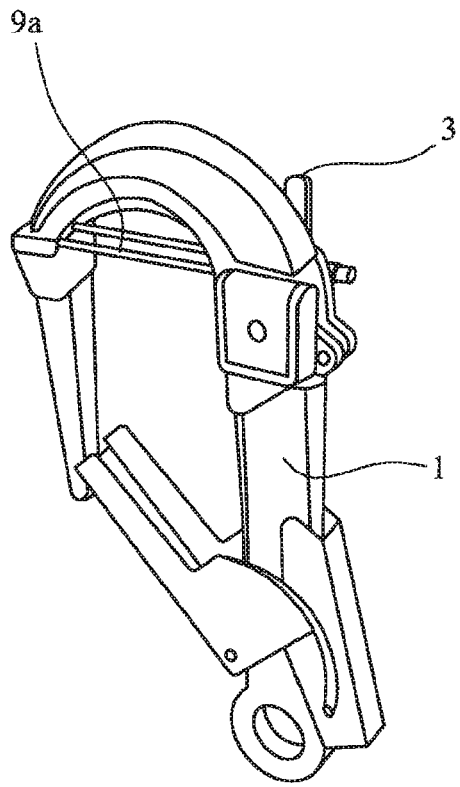
FIG. 3a shows a safety hook having a load detection sensor in accordance with a third embodiment of the present invention.
Figure 3B:
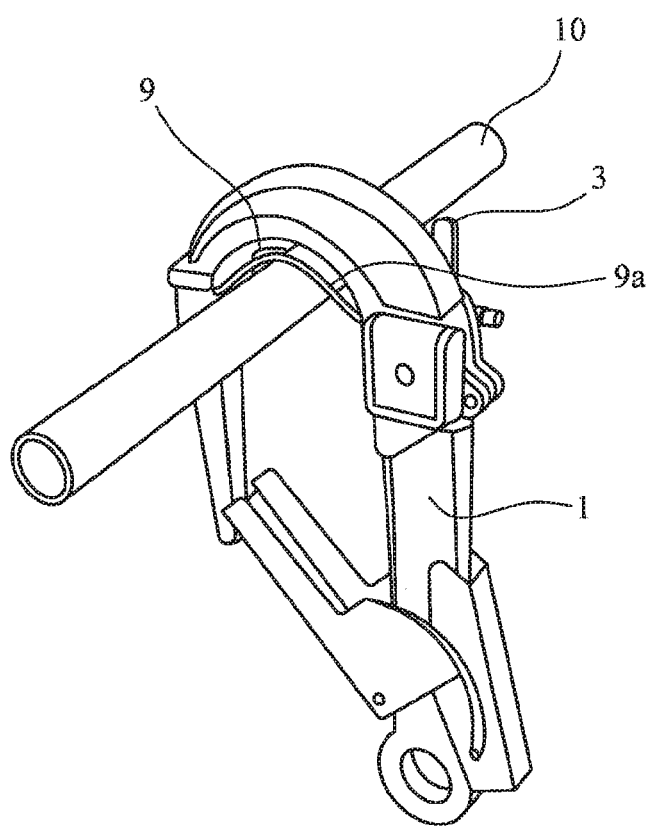
FIG. 3b shows the safety hook of FIG. 3a in use.

Referring now to FIGS. 3a and 3b, there is shown a load detection sensor 9 according to a third embodiment of the present invention. In this particular embodiment, the load detection sensor 9 comprises a first and second self-energising switches mounted on a rigid plate which rigid plate is adhered to a standard safety hook 1, each self-energising switch being operably connected to a steel cable 9a. A transmitter 3 arranged to relay a load status signal is also mounted on the rigid plate. In use, the first self-energising switch is arranged to be activated when the steel cable 9a is pulled so that when the safety hook 1 is connected to a line 10, the first switch is activated and generates a load detection signal which is relayed by the transmitter 3 to processing means. Whereas, the second self-energising switch is arranged to be activated when the steel cable 9a is in a relaxed condition so that when the steel cable 9a is relaxed, the second self-energising switch is activated and a second load detection signal is relayed by the transmitter to the processing means.

Figure 4:
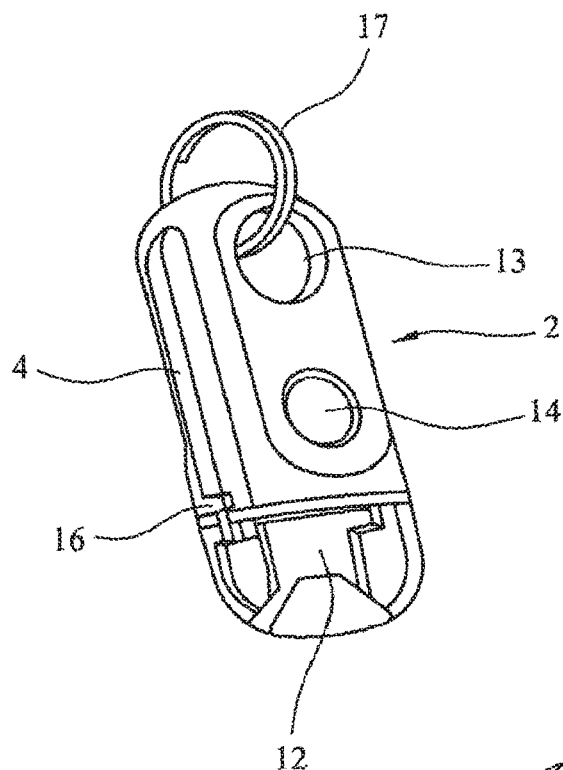
FIG. 4 shows processing means in accordance with an embodiment of the present invention.

FIG. 4 shows a processing unit or beacon 4 including processing means 2, the beacon 4 having an activation switch or other activation means 14, and an opening 13 for receiving a metallic ring 17 which allows the beacon to be secured to a standard harness. Warning means 12, in this instance a super bright LED, is secured to an end of the beacon 4. In addition zip ties 16 are provided for securing the beacon 4 to items, such as clothing, which do not have a suitable opening 13. As described above in relation to FIG. 1, processing means 2 is operably connected to a receiver which receives a load status signal from a transmitter 3. Processing means are arranged to analyse the load detection signal from a load detection sensor 5, 7, 9 and to produce an output signal and to control the warning means so that a range of notifications or signals are generated to indicate whether the safety hook 1 is connected to a safety line and/or whether a load greater than a predetermined threshold is applied to the load detection sensor 5, 7, 9. A beacon 4 according to this embodiment of the present invention can be used with any of the load detection sensors 5, 7, 9 described in relation to FIGS. 1, 2, 3a and 3b. The beacon 4 is powered with standard batteries, such as AA batteries. In this particular embodiment, the beacon 4 comprises an activation switch 14 and a counter arranged to allow a user to activate the beacon 4 from a non-operational state to an operational state by pressing the activation switch. Once the beacon 4 has become operational, the counter measures a predetermined time interval, for example 3 months, and sends a time lapse signal to the processing means 2 once the predetermined time interval has elapsed. In this embodiment, the processing means 2 are further arranged to analyse the time lapse signal and to produce a time output signal which time output signal causes the warning means to generate a time elapsed alarm, either visible, audible or both, to notify a user that the life-span of batteries has elapsed. The processing means monitors the batteries and also produces a time output signal if it detects that there is insufficient power left, i.e. that the batteries are running low so that the warning means generates a time elapsed alarm, either visible, audible or both, to alert the user that the batteries must be replaced. A three month time interval is particularly useful because safety equipment is generally inspected every three months and, in general, batteries would be expected to have a useful life of around 3 months. The counter can be adapted to reset once the batteries have been replaced and the activation switch 14 has been pressed.

Figure 5:
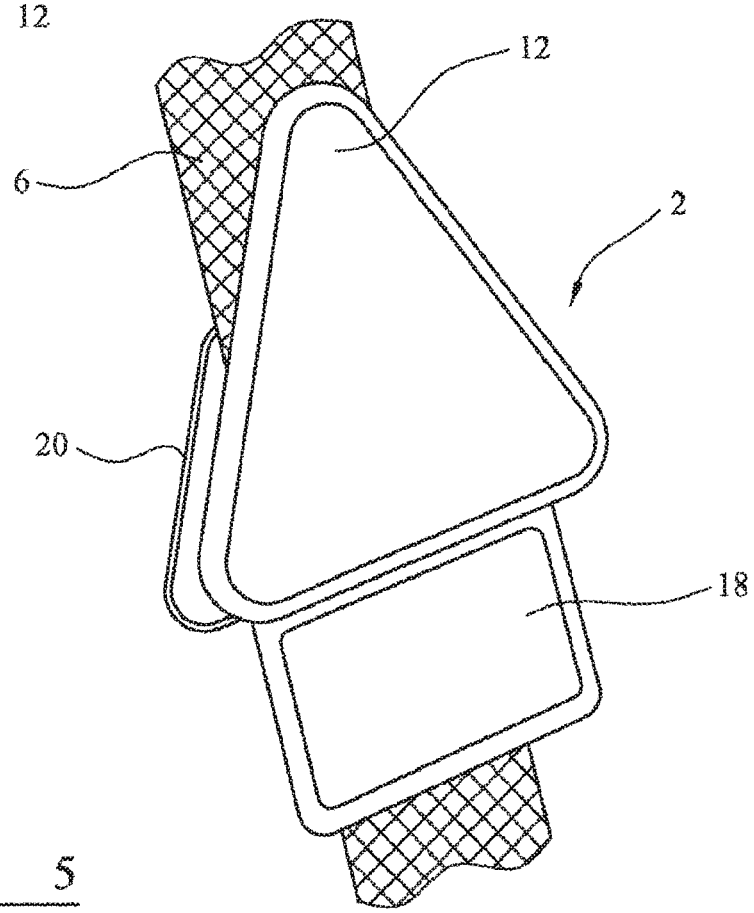
FIG. 5 shows processing means in accordance with another embodiment of the present invention.

Referring now to FIG. 5, there is shown a second type of processing unit. In this embodiment, the processing means 2 are housed in a processing unit comprising a super bright LED 12 and a metallic back plate 20 for securing the processing unit to a standard harness 6. As above, the processing unit is powered by batteries and may include a counter. Display means 18 are secured to the processing unit to enable an equipment inspector to mark the processing unit with an inspection message including for example, date, time, and initials or name of the last check.

Figure 6:
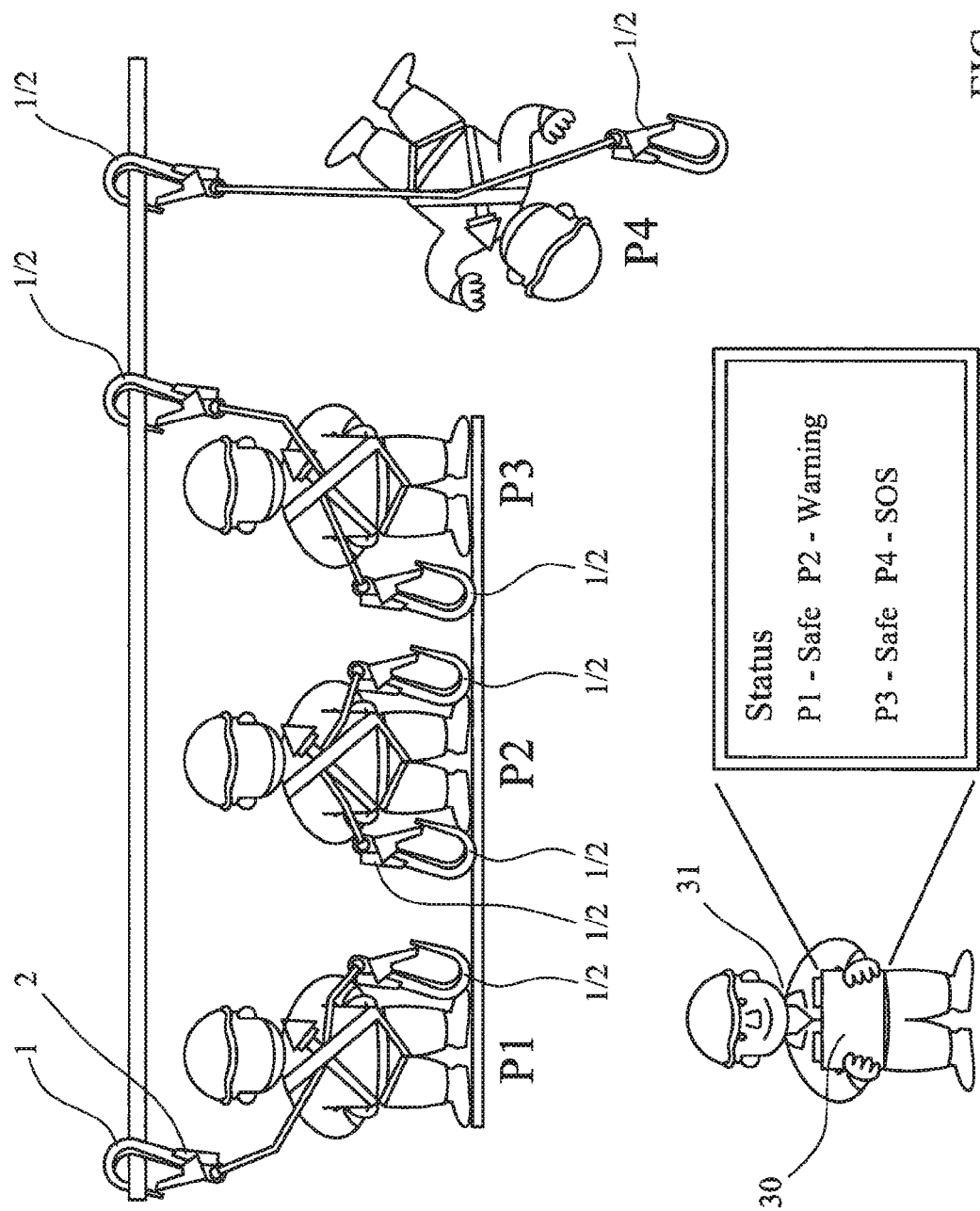
FIG. 6 is a diagrammatic representation of a computerised security system for displaying at a monitoring station the status of four workers each having a safety hook having a load detection sensor and processing means in accordance with the present invention.

Referring now to FIG. 6 there is shown a scheme of a further embodiment of the present invention in which the processing means 2 are arranged to communicate wirelessly with a monitoring device 30, such as an on-site computer, to allow a supervisor 31, for example a site manager, to remotely monitor use of the safety equipment. As illustrated, four site workers P1 to P4 are shown, each wearing two safety hooks 1 and/or processing means 2 each tagged with an ID so that the supervisor 31 remotely monitoring use of the safety equipment can determine whether any specific users on the site are appropriately secured to a safety line. As shown, workers P1 and P3 are correctly hooked up with their second hook secured to their harness and the appropriate signal is sent remotely to the monitoring device 30 where the status of these two workers is indicated as "Safe". Worker P2 is not hooked up and a warning signal is sent remotely to the monitoring device 30. The processing means 2 preferably includes a radio link to enable the supervisor to speak directly to the worker to check where the worker is and whether he/she should be hooked up or not, even though the employee may not be visible to the supervisor. Worker P4 is illustrated as having fallen which generates an emergency signal which is sent directly to the supervisor who can immediately identify the worker and implement SOS procedures. Thus, if there is an accident on-site, the supervisor is immediately and remotely alerted to facilitate a prompt and appropriate response. In this embodiment, the processing means need not be housed in a processing unit and could be housed in the safety hook 1, for example. Further, in this embodiment, the warning means may be remotely connected to the processing means. The main purpose of the second hook is to enable workers to move position and to clip on the second hook in a new position, before removing the first hook. In this way the worker is always clipped in position.

Figure 7:
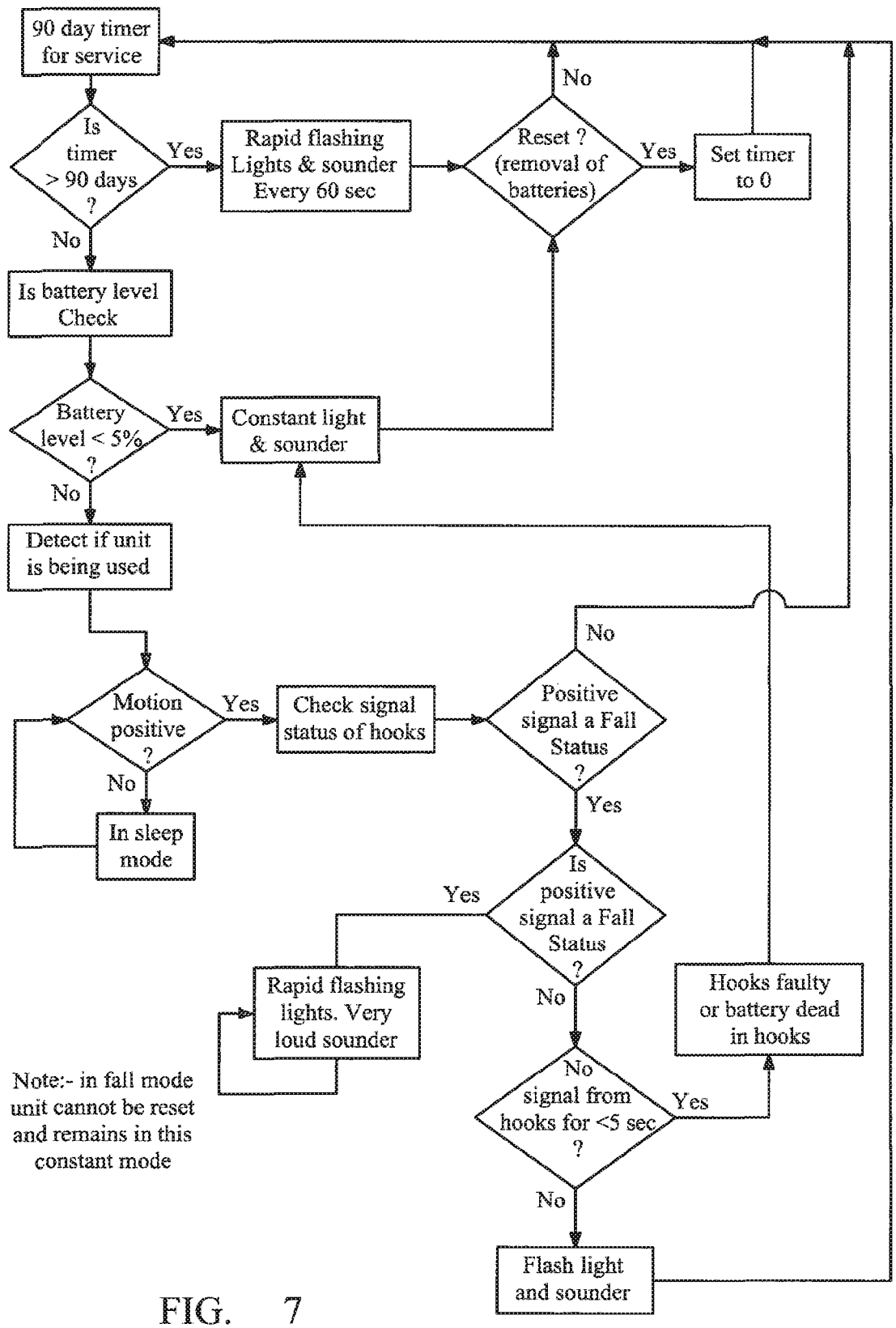
FIG. 7 is a block diagram illustration of example logic steps followed by processing means according to the present invention.

FIG. 7 shows block diagram illustration the logic steps followed by processing means 2 according to the present invention. As seen in FIG. 7, the system is provided with a day counter. In a first step, the system establishes whether the counter has measured over 90 day (i.e. 3 months) of service. If the answer is yes, the processing unit causes the system to generate, for example, a flashing light and a sound to enable a user to remove the batteries from the processing unit to reset the system and, as a result, the counter is reset to zero. If the answer to the first step is no, the processing unit determines whether the battery level is under 5%. If the battery level is below 5%, the processing means cause the system to generate a constant light and a sound to alert a user that the battery is low. If the battery level is above 5%, the processing means proceeds to the next step in which the processing means determines if the system is being used. If the system in in sleep mode, the processing unit follows repeats the step in a loop until it detects motion. On the other hand, if motion is detected, the processing means proceeds to the following step in which it checks whether a signal from the hook or hooks has been received. If no signals are detected, the processing means loops back to the first step in a loop and follows each subsequent step. If a positive signal from the hook or hooks is detected, the processing unit proceeds to determine whether the signal relates to a fall status. In the event the signal is related to a fall, the processing means causes the system to generate flashing lights and a loud audible alarm to alert on-site personnel that a user is in danger. To ensure safety of the users, the system could be set up to prevent a reset when a fall signal has been detected mode. If the signal does not relate to a fall, the processing unit proceeds to determine whether the signal is constant or intermittent. If the signal has an interval of over 5 seconds, the processing means assumes that the hook or hooks are faulty or that the battery level is under 5% and causes the system to generate a constant light and a sound. If the interval between two instances of detection of a signal is below 5 seconds, the processing means causes the system to produce a flashing light and a sound to alert on-site personnel that the user might be in danger.

Figure 8:
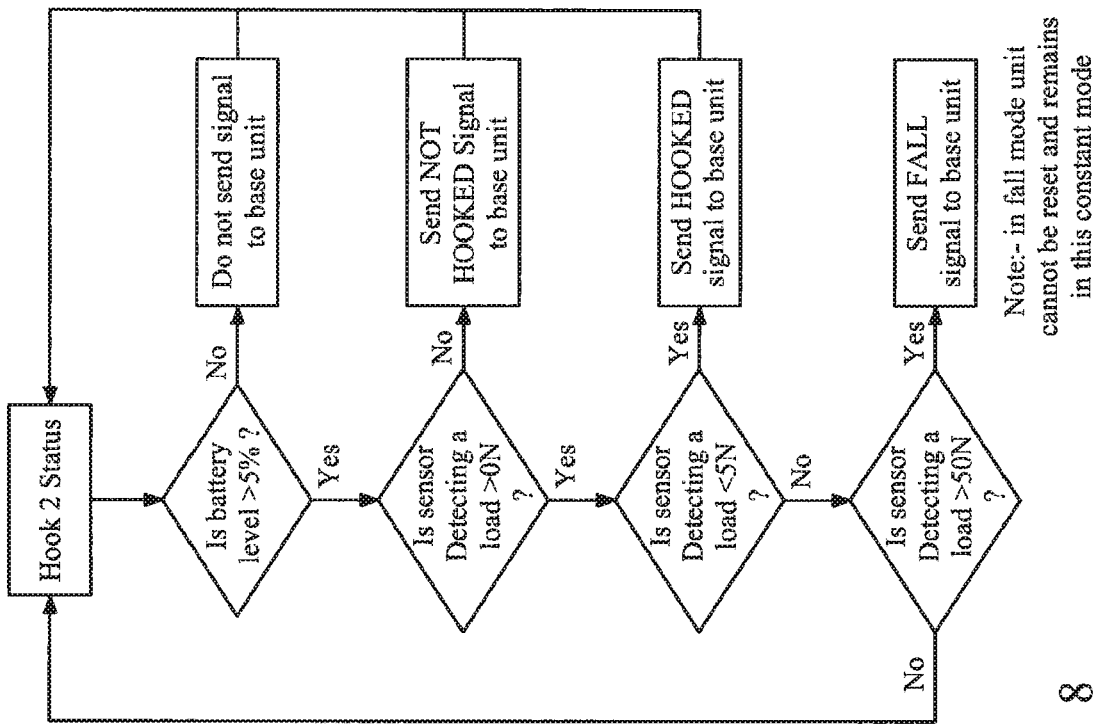
FIG. 8 is a block diagram illustration of example logic steps followed by a pair of load detection sensor connected to the processing means of FIGS. 4, 5, 6 and 7 above.
Figure 8:
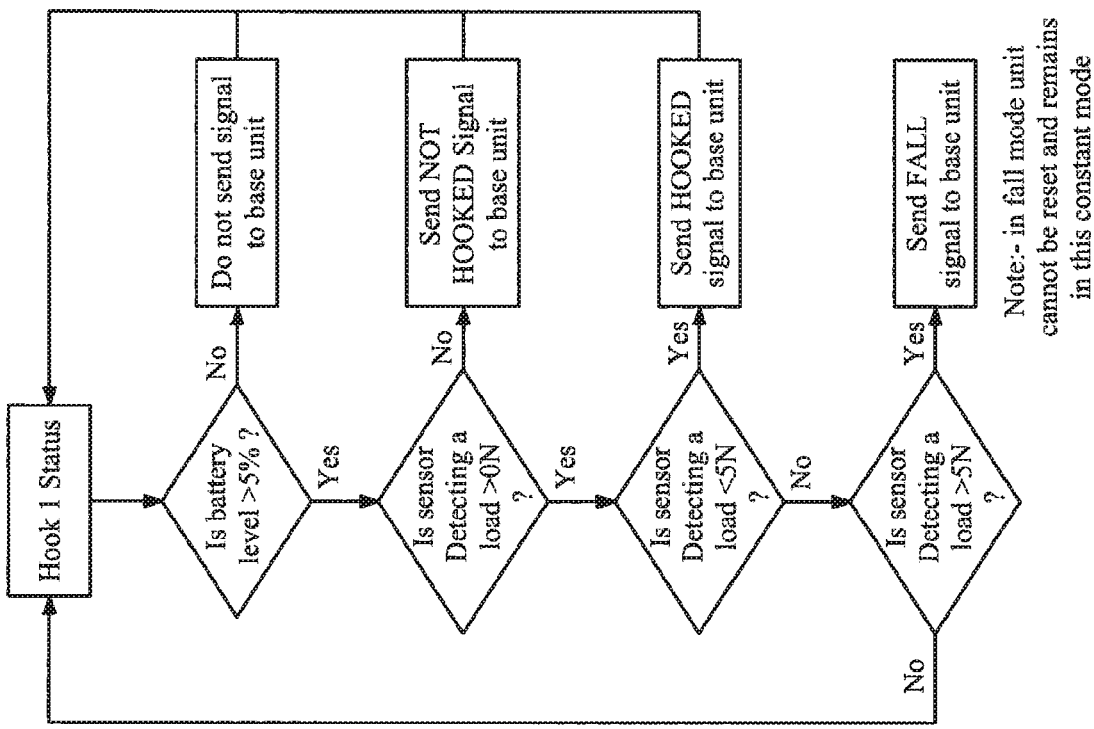

Referring now to FIG. 8, there is shown block diagram illustration the logic steps followed by a pair of load detection sensors 5, 7, 9 connected to the processing means described in relation to FIGS. 4, 5, 6 and 7 above. Each sensor follows the same logic steps simultaneously. In a first step, the processing unit determines whether the battery level is over 5%. If the battery level is under 5%, the processing unit does not receive a signal from the hook. If the battery level is over 5%, the processing means proceeds to determine whether the hook sensor detects a load over ON. If no load is detected, the processing means causes the system to generate a signal to alert the system that the user is not hooked. If a load is detected, the processing means determine whether the load is under 5 N. If the load detected by the hook sensor is below 5 N, the processing means causes the system to generate a signal to indicate that the user is hooked. If the load detected is not under 5 N, the processing means determines whether the load exceeds 5 N. If the load detected does not exceed 5 N, the logic loops back to the first step. However, if the load detected by the hook sensor exceeds 5 N, the processing means causes the system to generate a FALL signal to alert on-site personnel that the user has suffered a fall. As the system shown in this figure comprises a pair of hooks, the processing means may be set up to generate an visual or audible alarm when either hook sensor detects a fall (i.e. a load which exceeds 5 N). In addition, the processing means may be programmed to generate an alarm when it detects that neither hook is connected to a line.

A transmitter 3 suitable for use with any of the embodiments of the present invention comprises a 433 MHz PCB antenna.

One of the main advantages of the present system, and in particular of the embodiment described in relation to FIG. 6, is that a supervisor can monitor whether any given user is employing safety equipment appropriately at any given time so that on-site personnel are encouraged to adhere to safety regulations and to use safety equipment. Moreover, it would allow evaluating personnel safety equipment history so that individual users found to systematically disregard safety regulations can be disciplined. Further, it would also allow a supervisor to monitor safety equipment use remotely so that regardless of the size of the site or project, a supervisor would always know if personnel are connected to a line and if an accident has occurred.

As mentioned one of the greatest advantages of the present invention is that it can be used with standard equipment such as harnesses, lanyards, hooks, ties and rope without altering the structural integrity of the standard equipment. Further, retrofitting the existing standard equipment is straightforward; as a result, there is not need to invest heavily in new equipment, so implementation costs are nominal. Although the embodiments above have been described in relation to a single safety hook, it should be clear to the skilled person that the safety system of the present invention could also be used with a two or more hooks so that the warning means generate a signal to indicate that all the two or more hooks are disconnected, connected or that a load greater than a predetermined value is being applied to one of the two or more hooks.

Moreover, it should also be apparent that the invention can be used with different types of hooks such as karabiners, ascenders, descenders, fall arresters, crane hooks and scaffold hooks.

In addition, it should be clear that the notifications generated by the warning means may be lights of different colours, lights flashing in different patterns, audible alarms, a combination of coloured/flashing lights and an audible alarm or any other suitable means to attract attention.

Further, it should also be apparent that although processing and warning means according to the invention have been described as being separate from the load detection sensor, it would possible to integrate both of these into a safety hook comprising a load detection sensor according to the present invention, for example by mounting them in the rigid plate described in relation to the second and third embodiments or by adhering them to the layer of shrinkable polymer plastics material described in relation to the first embodiment once heat has been applied to it.

Moreover, it should be clear that the beacon and control unit could be powered with any suitable power source other than batteries, such as: a kinetic power generator/microgenerator or a solar power cell.

Although the safety system of the present invention has been described in relation to its use in the construction industry, it should be clear to the skilled person that the safety system could also be used for scaffolding, climbing, abseiling, sailing, rope rescue, industrial rope work, window cleaning and any other activity in which safety belts and or harnesses are necessary.

What is claimed is:

1. A safety system, comprising:
    (a) a rope or lanyard;
    (b) a safety hook attached to the rope or lanyard;
    (c) a load detection sensor retrofit on the safety hook without altering the structural integrity of the safety hook by being mounted on or shrink wrapped on the safety hook, wherein the load detection sensor generates a load status signal; and
    (d) a transmitter arranged to receive the load status signal from the load detection sensor and to transmit the load status signal therefrom.

2. The safety system of claim 1, wherein a notification is generated from the load status signal sent by the transmitter.

3. The safety system of claim 2, wherein the notification is indicative that a load is undetected or a safety hook is connected to a safety line.

4. The safety system of claim 2, wherein the notification is indicative that a load greater than a predetermined threshold is detected or the safety hook is disconnected.

5. The safety system of claim 1, further comprising:
    a second rope or lanyard and a second safety hook, the second safety hook being attached to the second rope or lanyard; and
    a second load detection sensor retrofit to the second safety hook.

6. The safety system of claim 1, wherein the load detection sensor is a pressure sensor.

7. The safety system of claim 1, further comprising:
    warning means adapted to generate a visual notification, an audible notification, or a visual and an audible notification.

8. The safety system according to claim 7, wherein the warning means comprises an LED light.

9. The safety system according to claim 1, further comprising:
    a beacon that includes processing means, a receiver and warning means.

* * * * *